United States Patent

[11] 3,603,599

[72] Inventor William F. Laird
 Waldron, Ind.
[21] Appl. No. 35,213
[22] Filed May 6, 1970
[45] Patented Sept. 7, 1971
[73] Assignee General Motors Corporation
 Detroit, Mich.

[54] COOLED SEAL
 6 Claims, 10 Drawing Figs.
[52] U.S. Cl. .................................................. 277/53,
 415/174, 277/96
[51] Int. Cl. ..................................................... F01d 11/08,
 F02f 11/00
[50] Field of Search .......................................... 277/96, 53,
 237; 415/174

[56] References Cited
 UNITED STATES PATENTS

| | | | |
|---|---|---|---|
| 2,963,307 | 12/1960 | Bobo ........................... | 277/53 |
| 3,291,382 | 12/1966 | Blackhurst et al. ........... | 415/174 UX |
| 3,365,172 | 1/1968 | McDonough et al. ........ | 277/53 UX |
| 3,411,794 | 11/1968 | Allen ........................... | 277/53 |
| 3,423,070 | 1/1969 | Corrigan ...................... | 277/53 |
| 3,529,905 | 9/1970 | Meginnis ...................... | 277/96 X |

Primary Examiner—Samuel B. Rothberg
Attorneys—Paul Fitzpatrick and Jean L. Carpenter ABSTRACT: A cooled blade tip seal strip in a turbine has a facing of honeycomb material underlaid by a sheet of porous material to which the honeycomb is bonded. The porous material has numerous distributed pores which conduct fluid from a chamber between the sheet and a structure on which it is mounted through the sheet and the honeycomb cells to provide cooling for the blade tip seal in the hot environment of the turbine.

PATENTED SEP 7 1971

INVENTOR.
William F. Laird

BY
Paul Fitzpatrick
ATTORNEY

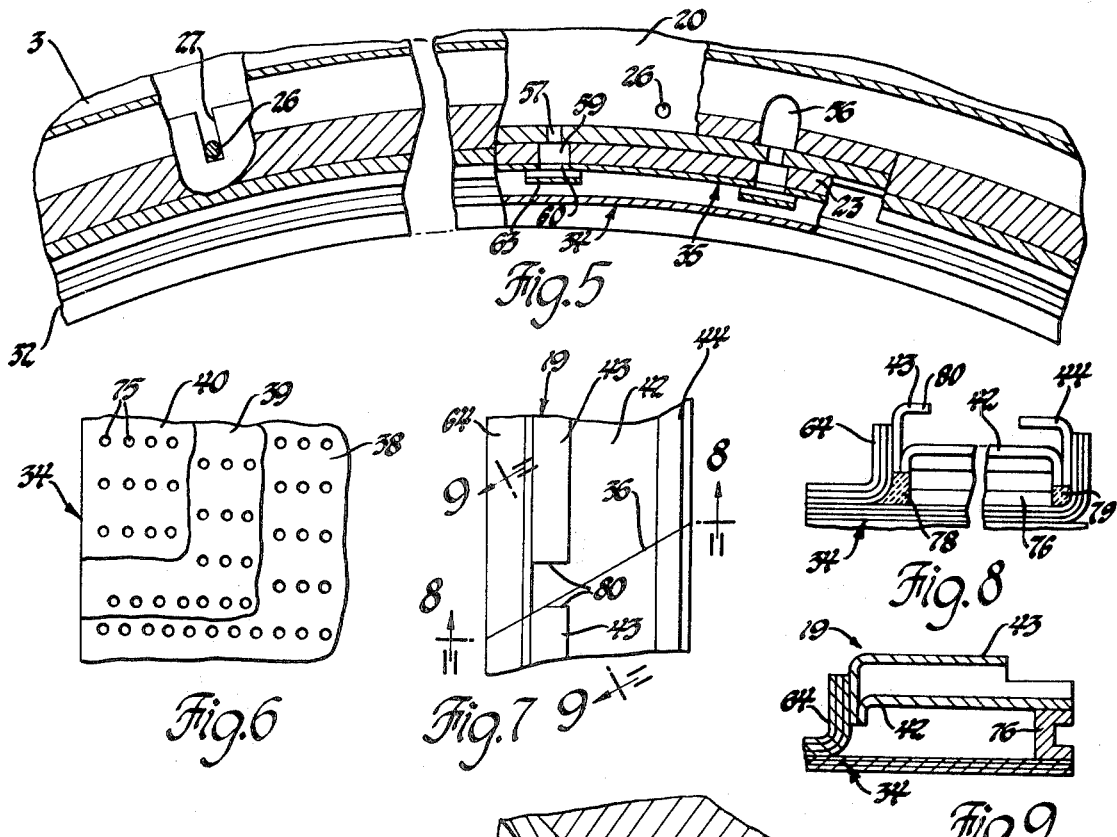
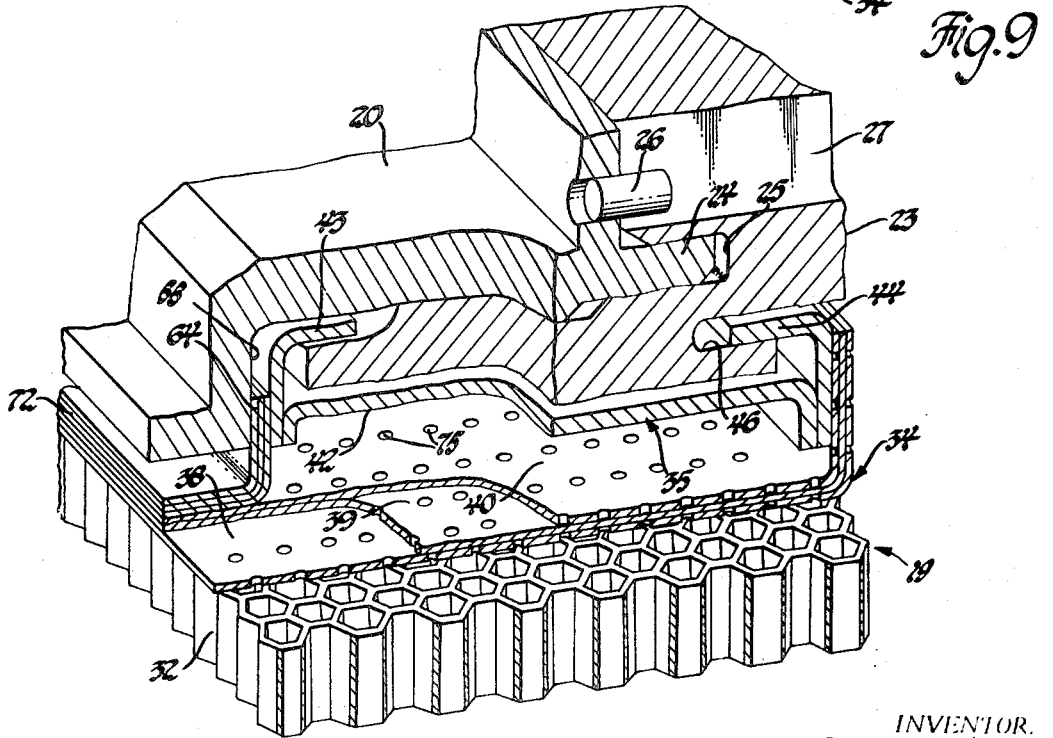

COOLED SEAL

The invention herein described was made in the course of work under a contract or subcontract thereunder with the Department of Defense.

My invention relates to seals for high temperature machines, particularly blade tip seals for turbines and the like and also to an improved seal material particularly suited for use in blade tips and other labyrinth seals. It further relates to an improved cooled turbine rotor shroud arrangement.

There have been previous proposals to mount a strip of cellular material to cooperate with blade tip edges or the edges of seal knives of conventional labyrinth seals in turbomachines. As pointed out in the prior disclosures, the use of a cellular material for a seal may be desirable to decrease the resistance to abrasion of the seal material in the event of interference between the parts. Also, in some cases, in very hot machines, it is desirable to cool the seal.

Prior disclosures include the following U.S. Pats.; Bobo, No. 2,963,307 for Honeycomb Seal, Dec. 6, 1960; McDonough et al. No. 3,365,172 for Air Cooled Shroud Seal, Jan. 23, 1968; Allen No. 3,411,794 for Cooled Seal Ring, Nov. 19, 1968; Corrigan, No. 3,423,070 for Sealing Means for Turbomachinery, Jan. 21, 1969; and the copending U.S. Pat. application, of common ownership with this application, of Meginnis for Cellular Metal and Seal, Ser. No. 667,027, filed Aug. 24, 1967 now U.S. Pat. No. 3,529,905.

The principal objects of my invention are to provide an improved abradable seal structure adapted for air cooling; to provide improved sealing means for turbomachinery; and to provide a cellular seal cooled by air fed to it through a backing layer of controlled porosity having numerous pores, such as to distribute the cooling fluid through a predominant proportion of the cell of the cellular structure. A further object is to make available a cooled seal structure for turbomachinery better suited to the requirements of practice than those previously known.

The nature of my invention and its advantages will be apparent to those skilled in the art from the succeeding detailed description and drawings of the preferred embodiment of the invention.

FIG. 5 is a view with parts cut away and in section of the rotor shroud and seal ring, taken generally on a plane perpendicular to the axis of rotation of the turbine indicated by the line 5—5 in FIG. 1.

FIG. 6 is a fragmentary view of the seal strip, with parts cut away, taken on the plane indicated by the line 6—6 in FIG. 2.

FIG. 7 is a developed view of the seal strip illustrating the joint between adjacent sections.

FIG. 8 is a cross-sectional view taken on the plane indicated by the line 8—8 in FIG. 7.

FIG. 9 is a sectional view taken on the plane indicated by the line 9—9 in FIG. 7.

FIG. 10 is an enlarged axonometric view, with parts cut away and in section.

Figure 1:
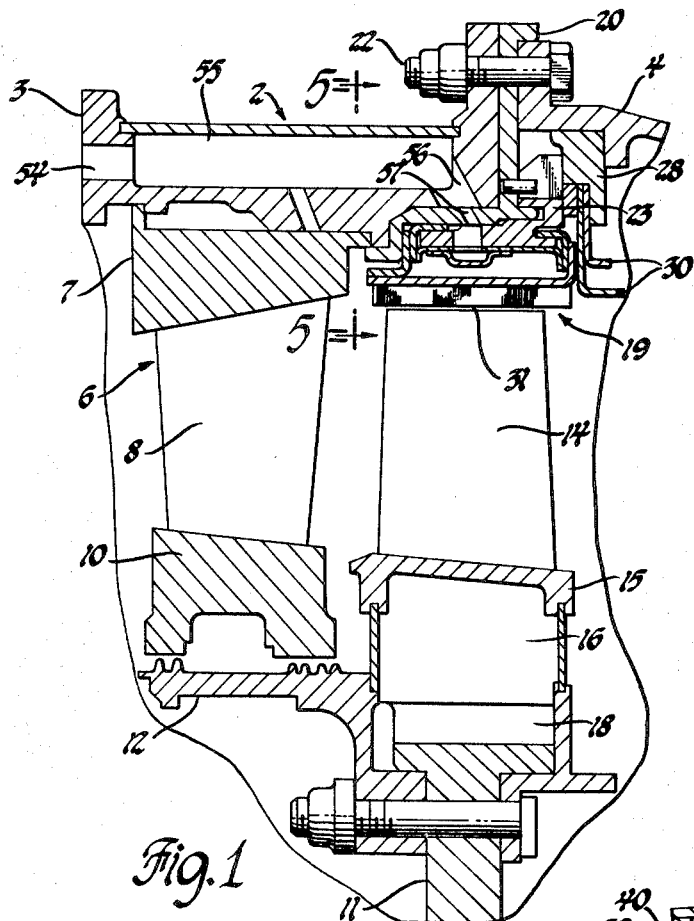
FIG. 1 is a sectional view of one stage of a turbine taken on a plane containing the axis of rotation thereof.

FIG. 1 illustrates structure of a gas turbine which may be considered to be typical of high temperature turbo machinery except for the seal structure of my invention to be described. The turbine includes a casing 2 made up of sections 3 and 4 bolted together. An annular nozzle 6 mounted in the case includes an outer shroud 7, vanes 8, and an inner shroud 10. A rotor wheel 11, the axis of rotation of which is not illustrated, mounts a labyrinth seal ring 12 which cooperates with the inner nozzle shroud 10 for minimization of flow bypassing the nozzle. Wheel 11 mounts an annular row of rotor blades 14 each blade including a platform 15, a stalk 16, and a root 18 mounted in a dovetail slot in the rim of wheel 11. Gas discharged into the turbine rotor by the nozzle 6 flows between adjacent blades 14 in a path bounded by the ring of blade platforms 15 and by a fixed blade tip shroud assembly indicated generally at 19. The shroud assembly 19 is mounted in the casing 2.

Figure 2:
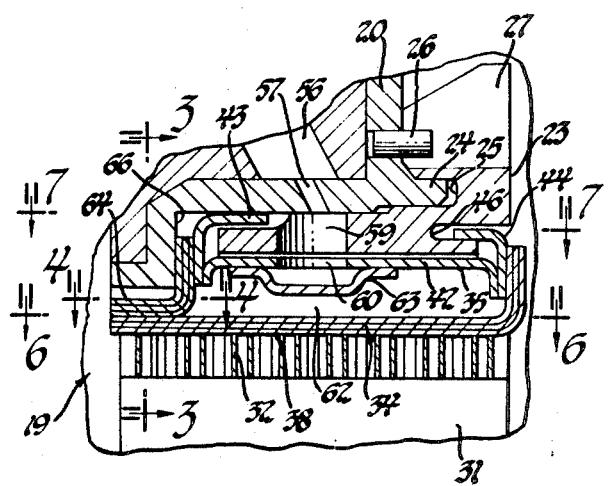
FIG. 2 is an enlarged view of a portion of FIG. 1 showing the rotor shroud and seal ring.

The blade tip shroud 19 (see also FIGS. 2, 5, and 10) is supported by a shroud mounting ring 20 which is fixed inside the casing section 3 by bolts 22 which secure the casing sections 3 and 4 together. The blade tip shroud comprises a supporting ring 23, which preferably is in two segments each of 180° extent. As shown clearly in FIGS. 2 and 10, the mounting ring 20 includes a rearwardly directed flange 24 which is received in a circumferential groove 25 in the support ring 23. The support ring 23 pilots inside the mounting ring and is located radially by the flange 24.

The segments of the support ring 23 are located circumferentially by dowels 26 pressed into the mounting ring 20 which engage in slots 27 in the support ring. Preferably, the dowels 26 are located at 45° intervals around the axis of the turbine. The support ring 23 is held axially by a ring 28 mounted between the ring 23 and a shoulder on the casing section 4. Ring 23 also provides a support for two sheet metal shroud rings 30 which define the outer boundary of the motive fluid path downstream from shroud 19.

The portion of the shroud which cooperates directly with the blades 14 and defines the outer boundary of the motive fluid path through the rotor may be termed a seal strip 31. This seal strip comprises as its principal elements a facing 32 of honeycomb material, a laminated porous metal sheet 34 bonded to the facing, and a locating structure 35 fixed to the sheet 34 and providing means to attach the seal strip to the support ring 23. In the preferred construction, the seal strip 31 is in four segments of 90° angular extent with the ends 36 of the segments cut off at an angle of approximately 30° to the axis of the engine as shown in FIG. 9. In the structure disclosed, which is a seal of about 9 inches radius, the facing 32 is of high temperature resisting honeycomb material with 0.063-inch diameter hexagonal cells made of 0.0025-inch thickness sheet, the depth of the facing being approximately 0.180 inch. These dimensions are subject to change, but it is desirable that the honeycomb be of a very small cell type to minimize leakage and that the cell walls be very thin to minimize resistance to abrasion of the honeycomb by the blades in the case of interference between the rotor and shroud.

The sheet 34 is a laminated porous material of controlled porosity made up of three layers 38, 39, and 40 bonded together, layer 38 being bonded to the facing 32. The sheet 34 is of a structure in which each layer has a large number of pores distributed preferably in a rectangular pattern, with the pores of each sheet out of register with the pores of the next adjacent sheet or sheets, and with surface relief at the interface between adjacent sheets such that the cooling air may flow parallel to the facings of the layers thus entering through pores in the layer 40 flowing then through pores in layer 39 and pores in layer 38 into the honeycomb material 32 from which it emerges at the radially inner surface of the honeycomb. The pores, at least in the sheet 38, should be close enough together that most of the cells of the honeycomb 32 will be supplied with cooling air so that local hot spots do not develop in the facing.

A pictorial disclosure of one type of laminated material which might be suitable for the sheet 34 may be found in British Pat. No. 1,175,816 to Rolls-Royce Limited for Improvements Relating to the Cooling of Aerofoil Shaped Blades, published Dec. 23, 1969. It is preferred in this case, however, that the layers of the sheet 34 be diffusion bonded and be of a material of the nature of Hastelloy X (trademark).

The locating structure 35 is in the form of a 90° circular arc. It comprises a base ring 42 and two flanges 43 and 44 welded to the margins of the base ring 42. The ring 42 lies approximately against the inner surface of the support ring 23 and the flanges 43 and 44 overlie surfaces of the support ring, the flange 44 being disposed in a groove 46 in the rear face of the ring 23. The seal strip 31 is mounted on the support ring 23 by sliding the flanges 43 and 44 into place on the support ring.

Considering now the circuit for supply of cooling air to the seal strip 31, the cooling air may come from any suitable source; in the usual arrangement it is taken from the outlet of the compressor of the gas turbine engine. Cooling air enters at 54 into an annular space 55 in the casing section 3. In the preferred embodiment, the air is conveyed to the seal through 32 passages 56 in the casing section 3 and passages 57 in the mounting ring 20 aligned with passages 56. The support ring 23 and base ring 42 have openings 59 and 60, respectively, these being of the same number in the total circumference as the number of passages 56. Passages 60 discharge cooling air into the coolant chamber 62 between the base ring 42 and sheet 34. Baffles 63 welded to the base ring 42 are disposed so as to prevent direct jetting of air from the hole 60 against the sheet 34 with an attendant local oversupply of coolant.

Figure 3:
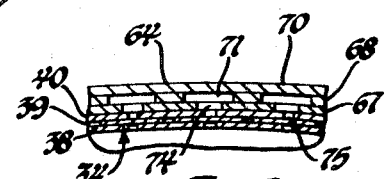
FIG. 3 is a detail sectional view taken on the plane indicated by the line 3—3 in FIG. 2.
Figure 4:
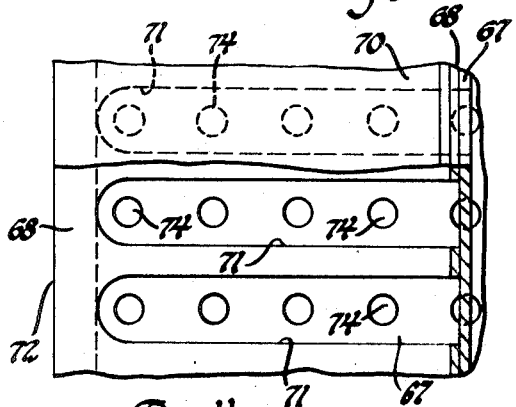
FIG. 4 is a detail developed view of the same, greatly enlarged and with parts cut away, taken on the plane indicated by the line 4—4 in FIG. 2.

The major structural element of the shroud structure which has not been described, is a flange element 64 which is an L-section strip of three-layer laminated material, the material being ordinarily of the same composition as the sheet 34. As shown most clearly in FIGS. 2 and 10, the L-section flange element 64 has a forward edge aligned with the forward edge of sheet 34 and defines a flange extending radially outward from the sheet adapted to abut a surface 66 on the shroud mounting ring 20. The flange 43 and the forward edge of base ring 42 previously described are bonded to the radially extending portion of element 64. The element 64 comprises three layers designated respectively as 67, 68 and 70 in the direction outwardly from the sheet 34 (see FIGS. 3 and 4). To provide for circulation of air from the coolant chamber 62 to the forward portion of sheet 34 which is covered by the flange element 64, the flange element is provided with structure to conduct the cooling air forward and admit it to the perforations in the radially outward layer 40 of the sheet 34. To provide this structure, the outermost layer 70 is imperforate. The upstanding flange portions of layers 68 and 67 are also imperforate, but the portion overlying the sheet 34 is provided with passages to conduct the coolant forward from chamber 62 and to the outermost layer 40 of sheet 34. This is provided by a large number of closely spaced slots 71 in the layer 68 which extend forward nearly to the forward edge 72 of the flange element 64. The slots 71 conduct the coolant to an array of holes or pores 74 in layer 67 aligned with the respective slots 71. The holes 74 overlie the pores such as 75 (FIG. 6) in the radially outermost layer of the sheet 34.

As previously pointed out, the blade tip shrouds 19 are preferably in four 90° sections which meet at skewed planes 36 at the end of the sections. It is considered desirable to prevent leakage of the coolant through the gap or crack at 36 between adjacent sections, which may have appreciable width under certain conditions of operation, depending upon relative expansion of parts of the turbine. For this reason, the ends of the coolant chamber 62 of each section of the seal 19 are closed. Structure for this purpose, shown particularly in FIGS. 8 and 9, involves a channel section block 76 bonded to the sheet 34 and base ring 42 and substantially closing the end of the section 19. This block extends from the forward to the rearward flange of the base ring 42. The remaining opening between the sheet 34 and the inner edges of the flanges of parts 42, 43, and 44 is closed by plugs 78 and 79 of weld metal shown clearly in FIG. 8.

The ends of flange 43 are cut off to define abutments at 80 which cooperate with a stop (not illustrated) on support ring 23 to locate the shroud ring segments circumferentially of the casing.

Presumably, the operation of the cooled seal will be apparent from the foregoing but may be described briefly. In operation of the turbine, the blades 14 rotate rapidly very closely adjacent the inner surface of the shroud 19. Cooling air supplied through section 3 of the casing and through passages 56 and 57 in the casing enters through holes 59 in the mounting ring 20 and holes 60 in the base ring 42. The air is deflected so as not to blast directly at the sheet 34 by the baffles 63 and thus fills the coolant chamber 62 under pressure. The air then flows through the perforations in the sheets 38, 39, and 40 which, as stated, are disaligned so that the air must flow parallel to the surface of the layers to some extent, a flow which is permitted by relief of the surfaces of the layers. The air to flow in this manner through the forward portions of the sheet 34 flows forwardly through the slots 71 cut in layer 68 of flange element 64 and through perforations 74 in the inner layer 67 into the perforations 75 in the outermost sheet 40. The perforations in the innermost sheet 38 are very closely arrayed so that the spacing between perforations is about that of the spacing of the cells of the honeycomb material of facing 32. Thus, the cooling air is widely distributed through the cells of the honeycomb and flows inwardly to exhaust into the turbine through the inner face of the honeycomb. This thorough dispersion of cooling air through the shroud structure maintains a very satisfactory degree of cooling, making possible cooling of about 1,000° F. Without waste of air or presence of hot spots in the honeycomb which would deleteriously affect its ability to resist the hot gas flowing pas the honeycomb.

It is important that the pores in the sheet 34 by closely spaced because it is important that all or most of these cells be supplied directly to the coolant and it is also important for proper sealing that the cells be quite small, as described. The scale depends in part upon the size of the turbine.

It will be seen that the seal strip 31 is readily mounted on the support ring 23, which is easily fitted into the turbine casing.

The detailed description of the preferred embodiment of the invention for the purpose of explaining the principles thereof is not to be considered as limiting or restricting the invention, as many modifications may be made by the exercise of skill in the art without departing from the spirit of the invention.

I Claim:

1. A cooled labyrinth seal element adapted for cooperation with an edge of a second seal element movable relatively thereto, the cooled seal element comprising, in combination, a support; a porous sheet fixed to the support and spaced from the support in part to define a coolant chamber between the support and sheet, the support defining an entrance for a coolant and the sheet defining numerous closely spaced outlets for the coolant from the chamber distributed over the area of the chamber; and a layer of honeycomb formation material overlying and bonded to the surface of the sheet defining cells with their axes approximately normal to the surface of the sheet and with the honeycomb cells open at the face of the material remote from the sheet, the said outlets being located so as to communicate with a preponderant number of the cells so that the coolant flows from the said outlets through the cells, the said face being juxtaposed to the path of the edge of the second seal element.

2. A cooled blade tip seal installation for a turbo machine comprising a casing, a rotor, and blades on the rotor having blade tips rotating in proximity to the casing, the seal installation comprising, in combination, a support mounted on the casing disposed adjacent the blade tips, a porous sheet mounted on the support and defining with the support a coolant chamber, and a honeycomb cell facing bonded to the sheet and having a sealing face disposed in sealing proximity to the path of the blade tips, the support defining a coolant inlet and the porous sheet defining a great number of pores distributed over the area of the sheet underlying the facing so as to distribute the coolant to a preponderant number of the cells of the facing so as to flow through the facing and cool the seal installation.

3. A cooled labyrinth seal element adapted for cooperation with an edge of a second seal element movable relatively thereto, the cooled seal element comprising, in combination, a support; a porous sheet fixed to the support and spaced from the support in part to define a coolant chamber between the support and sheet, the support defining entrances for a coolant directed toward the sheet and the sheet defining numerous closely spaced outlets for the coolant from the chamber distributed over the area of the chamber; a baffle disposed between each said entrance and the sheet to inhibit direct jetting of the coolant to local areas of the sheet, and a layer of honeycomb formation material overlying and bonded to the surface of the sheet defining cells with their axes approximately normal to the surface of the sheet and with the honeycomb cells open at the face of the material remote from the sheet, so that the coolant flows from the said outlets through the cells, the said face being juxtaposed to the path of the edge of the second seal element.

4. A cooled blade tip seal installation for a turbo machine comprising a casing, a rotor, and blades on the rotor having blade tips rotating in proximity to the casing, the seal installation comprising, in combination, a support mounted on the casing disposed adjacent the blade tips, a porous sheet mounted on the support and defining with the support a coolant chamber, and a honeycomb cell facing bonded to the sheet and having a sealing face disposed in sealing proximity to the path of the blade tips, the support defining coolant inlets including baffles effective to direct the coolant entering the coolant chamber generally parallel to the sheet, and the porous sheet defining a great number of pores distributed over the area of the sheet underlying the facing to distribute the coolant to cells of the facing so as to flow through the facing and cool the seal installation.

5. A cooled labyrinth seal element adapted for cooperation with an edge of a second seal element movable relatively thereto, the cooled seal element comprising, in combination, a support; a porous sheet fixed to the support and spaced from the support in part to define a coolant chamber between the support and sheet, the support defining an entrance for a coolant and the sheet defining numerous closely spaced outlets for the coolant from the chamber distributed over the area of the chamber; and a layer of honeycomb formation material overlying and bonded to the surface of the sheet defining cells with their axes approximately normal to the surface of the sheet and with the honeycomb cells open at the face of the material remote from the sheet, so that the coolant flows from the said outlets through the cells, the said face being juxtaposed to the path of the edge of the second seal element; the sheet being in part covered by a flange element partially defining the coolant chamber, the flange element being a laminated structure of a plural number of layers, at least one of said layers defining passages extending generally parallel to the sheet to communicate the coolant to the part of the sheet covered by the flange element.

6. A cooled blade tip shroud assembly for a turbo machine comprising a casing, a rotor, and blades on the rotor having blade tips rotating in proximity to the casing, the shroud assembly comprising, in combination, a support mounted on the casing disposed adjacent the blade tips, a porous sheet mounted on the support and defining with the support a coolant chamber, and a honeycomb cell facing bonded to the sheet and having a sealing face disposed in sealing proximity to the path of the blade tips, the support defining a coolant inlet and the porous sheet defining a great number of pores distributed over the area of the sheet underlying the facing to distribute the coolant to a preponderant number of the cells of the facing so as to flow through the facing and cool the seal installation; the shroud assembly being composed of a plural number of part circular segments, each segment including means closing the ends of the coolant chamber at the ends of the segments.